United States Patent [19]

Smith

[11] Patent Number: 5,220,989
[45] Date of Patent: Jun. 22, 1993

[54] MODULAR TRAY ACCUMULATOR SYSTEM

[75] Inventor: Lloyd H. Smith, College Station, Tex.

[73] Assignee: Texas A&M University, College Station, Tex.

[21] Appl. No.: 931,907

[22] Filed: Aug. 17, 1992

Related U.S. Application Data

[63] Continuation of Ser. No. 738,957, Aug. 1, 1991, abandoned, which is a continuation of Ser. No. 362,573, Jun. 7, 1989, Pat. No. 5,046,597.

[51] Int. Cl.$^5$ ............................................. B05G 37/00
[52] U.S. Cl. ............................ 198/347.4; 198/464.2; 198/435
[58] Field of Search ............... 198/435, 347.4, 570, 198/586, 810, 464.2, 857, 347.3, 347.1, 725; 414/331, 781; 186/49, 50

[56] References Cited

U.S. PATENT DOCUMENTS

| | | |
|---|---|---|
| 2,536,756 | 1/1951 | Lopez . |
| 4,236,604 | 12/1980 | Warner ............................ 198/810 |
| 4,410,081 | 10/1983 | Weihe, Jr. ...................... 198/725 X |
| 4,582,188 | 4/1986 | Seiz et al. ........................ 193/40 |
| 4,867,299 | 9/1989 | Fukuoka et al. ................ 198/435 |

Primary Examiner—Robert P. Olszewski
Assistant Examiner—Cheryl L. Gastineau
Attorney, Agent, or Firm—Arnold, White & Durkee

[57] ABSTRACT

A modular tray accumulator system includes a number of horizontal and vertical stacked conveyors arranged in a portable module. Each conveyor operates independently of the others. The system may be mechanically raised or lowered to any desired height, or may be moved between different floors as a unit. In a first embodiment, each conveyor is activated when a tray is placed on the input end of the conveyor, and moves a preselected distance forward. In a second embodiment, the trays are moved forward by variable friction drive.

10 Claims, 3 Drawing Sheets

MODULAR TRAY ACCUMULATOR SYSTEM

This application is a continuation of application Ser. No. 07/738,957, filed Aug. 1, 1991, abandoned, which is a continuation of Ser. No. 07/362,573 filed Jun. 7, 1989, U.S. Pat. No. 5,046,597.

BACKGROUND OF THE INVENTION

1. Field of the Invention

The present invention relates to tray accumulator systems for dish trays and the like. More particularly, the invention relates to the accumulation and high density storage of food and dishes on cafeteria trays, banquet trays, bus boxes, bun pans, dish racks, or other containers in a large volume food or beverage operation and the removal and storage of said items from the dining area for cleaning at a later time.

2. Description of The Related Art

Conveyor systems for dish trays are old in the art. Large volume food operations are extremely labor intensive and the ability to remove and store soiled dishes for processing at off-peak times is a desirable feature of those systems. U.S. Pat. No. 4,676,365 relates to a motor-driven endless tray accumulator in which an endless train of soiled dish receiving racks are supported by dollies that are moved continuously along an oval track. Each rack is mounted on a dolly and receives a plurality of dish trays. An operator removes the trays with soiled dishes from the racks. One of the problems of this system is that it is extremely labor intensive and the ability to queue up dish trays and accumulate a large quantity of trays prior to processing is limited. There is a need for high density storage of dish trays that does not require constant operator intervention.

Large volume food and beverage operations typically have peak processing periods around or following the meal time period. Because of this, dishwashing areas have a large variation in the work load. Further, the dish room operators have no way to control the flow of dishes to them during peak periods. The result is that dishes must be accumulated prior to processing. Another problem is having space available for the customer to deposit a tray of soiled dishes. In the prior art dish processing systems, a conveyor that has been filled with trays would sometimes require the customer to wait until an open spot in the conveyor was available.

SUMMARY OF THE INVENTION

The present invention overcomes the above-mentioned problems and disadvantages by providing a modular tray accumulator system. The system may be mechanically raised or lowered to the desired height for optimum loading and unloading of dishes. The invention provides for high density storage of dish trays without the need for constant operator intervention. This system is designed to reduce labor requirements during critical peak periods, and provides high density storage to minimize floor space requirements.

The invention includes a modular system having a series of motor-driven conveyors arranged in horizontal and vertical rows with each conveyor operating independently of the others. At the input or load end of the conveyors, facing the customer or dining room area, a series of slots is provided in which to place the soiled trays. At the output or discharge end of the conveyor is the scrapping area or dishwasher area.

Each conveyor serves to accumulate dish trays during peak periods. The conveyor is then reactivated to discharge the dishes for processing at another period of time.

In accordance with the present invention, when the customer places a dish tray at the input end of a conveyor, the tray is either moved forward a preselected distance or comes to rest against the preceding tray until the conveyor is full. In a first embodiment, the tray contacts a switch at the input end of the accumulator conveyor, and is propelled one tray length forward and stops. In a second embodiment, the tray is propelled by variable friction drive means towards the unload end of the accumulator conveyor.

The modular tray accumulator system may be moved as a unit to another location for discharging the dishes. A series of guide tubes and lifting means are provided so that the module can be raised or lowered, for example—between floors of a building. Thus, the present invention provides a series of conveyors that may be used to store and transport a large number of dish trays and move those trays to other locations. Accordingly, it is an object of the invention to provide a series of conveyors to store customer dish trays and the like.

It is a further object of the invention to provide a conveyor system that mechanically moves dish trays through the system to provide automatic accumulating of those trays when the system is unattended.

A further object of the present invention is to provide a conveyor and accumulator system that will reduce labor, utilities and waste by eliminating the need for constant monitoring of cafeteria trays. An advantage of the system of the present invention is that it allows a steady rate for processing of dishes at the output end of the conveyor, thereby saving water and dishwashing chemicals. The system also may be used as a portable or mobile unit to deliver prepared food to a large group of people and then reverse the system and return the soiled dishes.

Another object of the present invention is to reduce breakage and food waste as a result of the reduction in handling, and provide a more effective method of storing and dispensing dish trays. Other objects and advantages of the invention will be apparent from the following description, the accompanying drawings and appended claims.

DETAILED DESCRIPTION OF THE PREFERRED EMBODIMENTS

Figure 1:
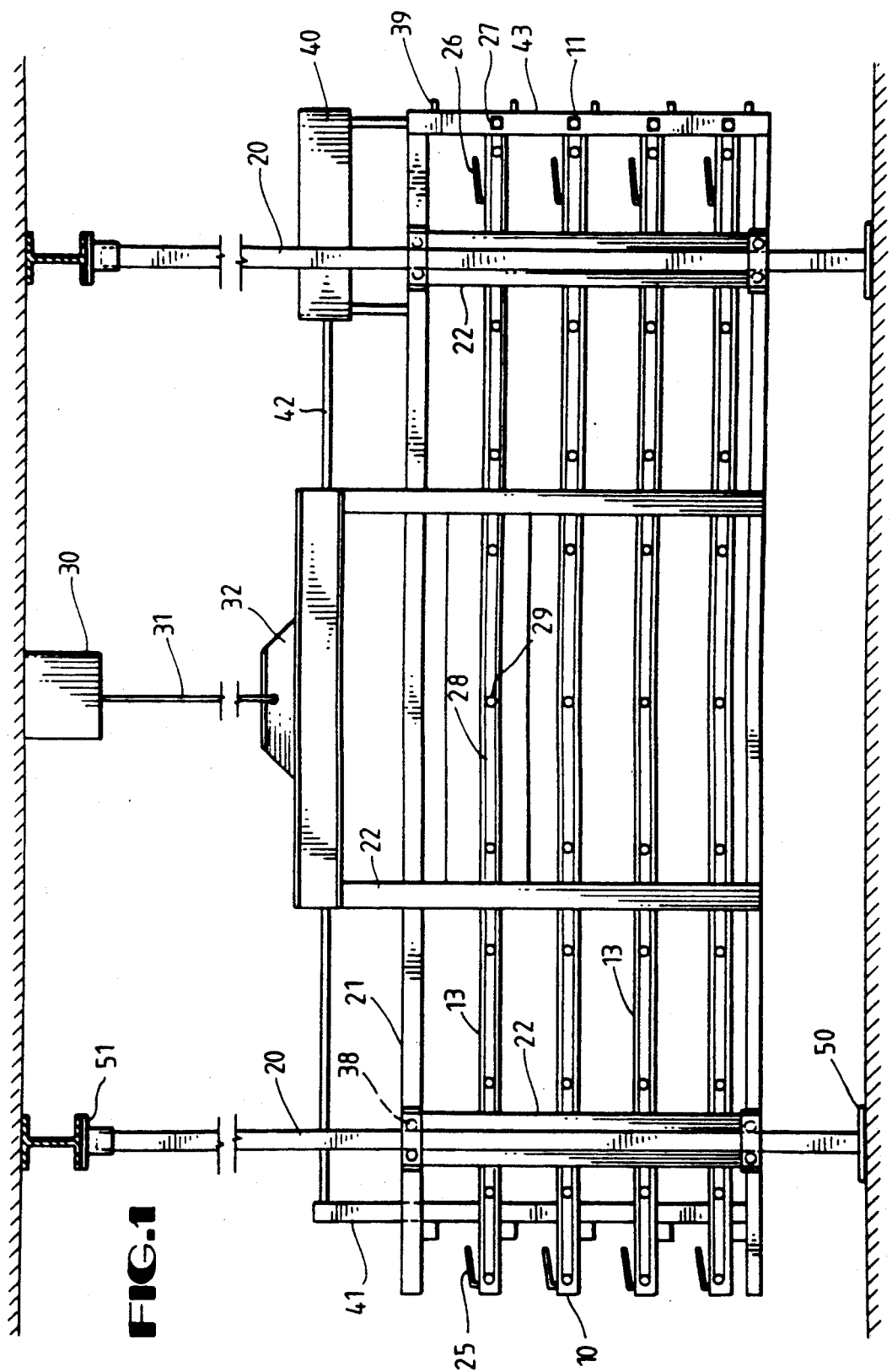
FIG. 1 is a side view partially in section, of the modular tray accumulator system according to a first embodiment of the present invention.
Figure 2:
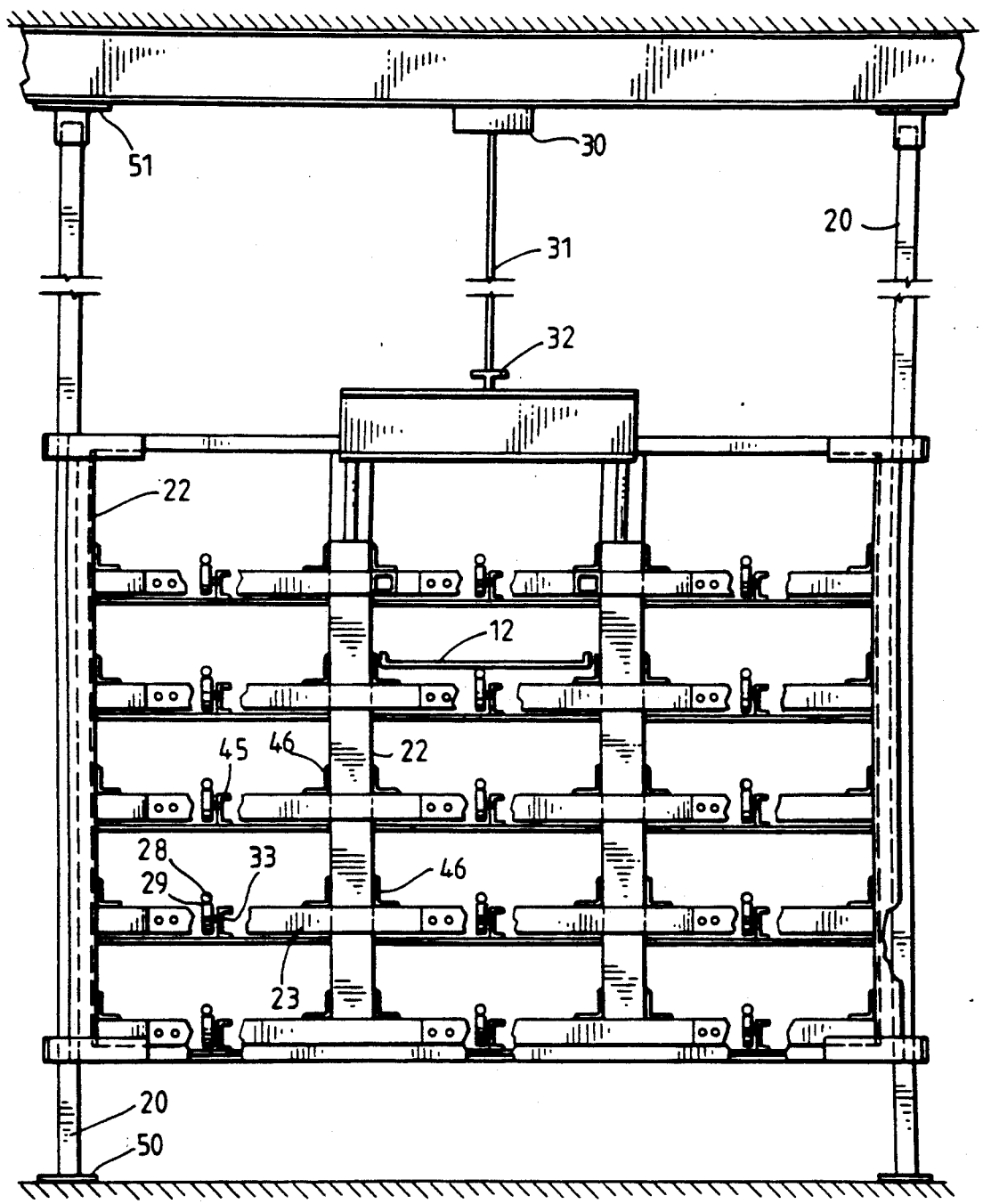
FIG. 2 is an end view, partially in section, of a first embodiment of the present invention.

As shown in FIG. 1 of the drawings, the present invention includes a series of conveyor assemblies 13 stacked upon one another, each of the conveyors 13 having an input end 10 and an output end 11. The conveyors 13 are designed to accumulate dish trays 12 (shown in FIG. 2). The conveyors 13 may be grouped together in modules, with one or more conveyors, and preferably three or more, in each of the horizontal and vertical dimensions. As shown in FIGS. 1 and 2, there may be three conveyors side by side, with four or five conveyors stacked vertically in a module.

The conveyor assemblies may be raised and lowered with a lift mechanism 30 which may be attached to the ceiling of a building or other structure. Lifting may be accomplished with a chain lift, cable lift or hydraulic cylinder means (not shown). A Cable 31 is shown between the lift mechanism 30 and lift support 32 attached to the module.

In accordance with the invention, a number of horizontally and vertically stacked conveyors are provided, with each conveyor operating independently of the others. The horizontal and vertical stacks are physically attached together in modules and are capable of being raised and lowered to adjust for variations in the loading or unloading height desired, or raised and lowered between floors by use of lift mechanism 30. The modular tray accumulator system may be attached to the floor with floor support 50 and to the ceiling with ceiling support 51. In a preferred embodiment, the floor support and ceiling support are connected to guide tubes 20, which are described below. Alternatively, the module may be mounted on rollers or casters attached to the bottom of the framework or upright supports 22, so that the module is portable and, for example, may be rolled onto elevators and the like.

In accordance with the present invention, the length of each conveyor may be varied, depending on the quantity of trays that are desired to be stored before processing. For example, the system may be designed to accumulate one thousand trays or more.

In a preferred embodiment, the basic structure of the conveyor module includes horizontal supports 21, upright supports 22, and lateral braces 23 (shown in FIG. 2). To raise and lower the module, a guide roller and clamp 38 may be used to guide the module along the guide tube 20. Guide tubes 20 are used in conjunction with the lift mechanism to adjust the height of the conveyor, and are mounted at each corner of the conveyor module.

In a first embodiment of the present invention, an endless drive belt or rope drive 28 encircles a series of channel mounted grooved wheels 29. The belt 28 carries the weight of each tray between the input end 10 and output end 11. As shown in FIG. 2, the edges of the trays may be supported by angle irons 46 on each side of the tray. The grooved wheels 29 may be mounted on axles 33, which are mounted on center channel irons 45.

At the input end of the conveyor, a paddle "on" switch 25, as shown in FIG. 1, is positioned to be depressed by the weight of a dish tray placed on the switch 25 at the input end of the conveyor. The paddle "on" switch 25 is spring loaded so that when the dish tray reaches the end of the paddle, the switch is released and stops the motor drive, leaving room for one additional tray on the input end of the conveyor. Accordingly, when the paddle "on" switch 25 is activated, the conveyor moves all of the dish trays one tray forward. The pattern is repeated until the first item on the conveyor reaches the output end of the conveyor. At the output end, a paddle "off" switch 26 is activated by the weight of the tray and prevents further movement of the conveyor. When unloading of the conveyor is desired, an override switch 39 may be used to activate the conveyor so that all the dish trays are continuously moved to the output end for processing. Drive motor 27 may be located adjacent the output end of the conveyor. A control panel 40 may also be located adjacent the output end of the conveyor, and is connected via electrical conduit 42 to the front panel 41 at the input end 10 of the conveyor.

Each conveyor in a module uses common upright supports 22 which preferably may be made of square tubing and are connected by bolting or welding the angle iron 46 to the upright 22. The output end of the conveyor also includes a support member 43 to support the drive motor 27 and override switch 39.

In the first embodiment of the present invention, conveying shall be provided by means of a plastic drive cord or belt 28 which is tensioned between driving wheels 9, which preferably are grooved. The motor may be a fully sealed motor with pulley arrangements. The motor may be battery operated if desired. Additionally, an electronic variable speed control and/or timing means may be provided so that the conveyor may be speeded up or slowed down and/or automatically shut off as desired.

Figure 3:
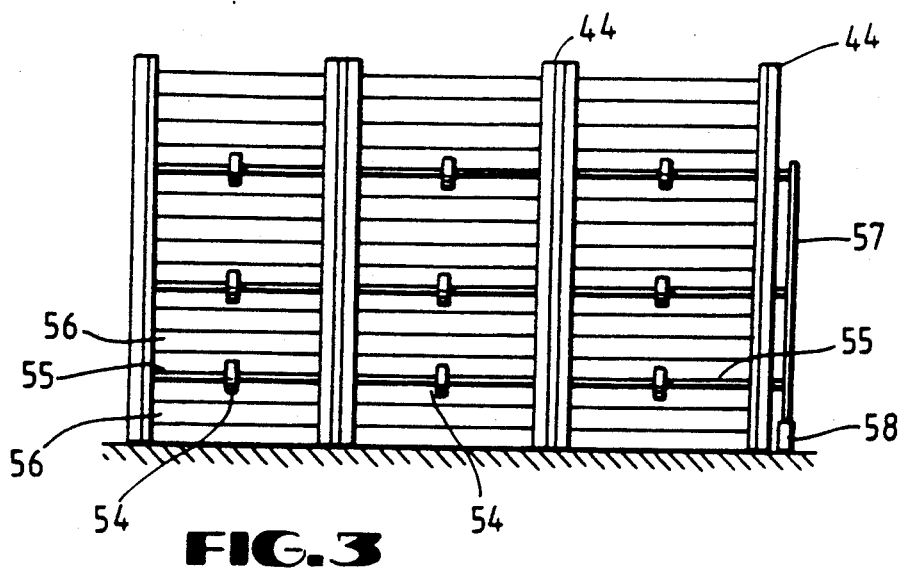
FIG. 3 is a top view of a portion of the modular tray accumulator conveyor system according to a second embodiment of the present invention.
Figure 3A:
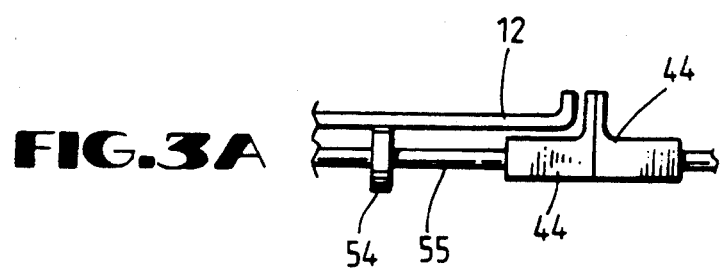
FIG. 3A is an end view, in section, showing the variable friction drive according to a second embodiment of the invention.

In a second embodiment of the present invention, shown in FIG. 3, a variable friction drive is provided. In the second embodiment, two channels 44 may be welded together to run the full length of each conveyor and support the edges of trays 12 (as shown in FIG. 3A). The channels 44 are held rigid and spaced apart by rods or shafts 55 spaced therebetween. Friction drive wheels 54 may be placed at intervals along each conveyor from the input to the output end, as shown in FIG. 3. These friction drive wheels are mounted to shafts 55, and are rotated by means of a drive belt 57 which is driven by motor 58. The friction drive wheels 54 may be constructed of a variety of different materials depending on the friction coefficient desired. In general, the friction drive wheels may be of a semi-flexible material so that movement of the dish trays is controlled. The material should be such that the wheel may rotate and move the tray forward, but not jam up trays on the conveyor. Power is transmitted to the rollers by variable speed motor shown as 58 in FIG. 3. Additionally, free rotating rollers 56 may be used between each of the drive wheels. The free rollers 56 may be mounted to spacer rods or provided with snap-in bearings (not shown) but are not driven by the drive belt 57. These rollers may be readily removed for cleaning.

In the second embodiment of the present invention, the friction drive wheels may be made of a suitable plastic material or may be "rotary brushes" to control the movement of the soiled trays over the free rollers and slow any fast-moving trays, but will not have such a great friction coefficient that the trays will be forced forward when the conveyor is full. The bearings on the rollers may be open type stainless steel bearings. Preferably, each conveyor may be capable of receiving one tray every few seconds, and the conveyor speed should not exceed approximately 50 feet per minute to avoid spilling liquids. Each conveyor is capable of accumulating a full compliment of trays end to end without causing overlapping or telescoping of the trays.

In the conveyor system of the second embodiment, all trays are moved to the output end of the conveyor where they are stopped by a physical barrier, or they are moved forward to the previous tray. The variable friction drive will not provide enough force to jar the trays and contents or allow them to override each other.

The arrangement of conveyors in a module having vertical and horizontal rows allows for immediate customer access to any unfilled position on the conveyor without waiting for an endless belt conveyor to rotate to an open spot. The present invention allows the conveyor to be filled to its maximum without any gaps in the conveyor. As discussed above, the modules may be raised or lowered to meet the access needs for customers or the unloading height for each operator at the output end. In addition, the module may be raised for cleaning beneath each conveyor. Further, the modules may be raised and lowered between different floors in a building.

Figure 4:
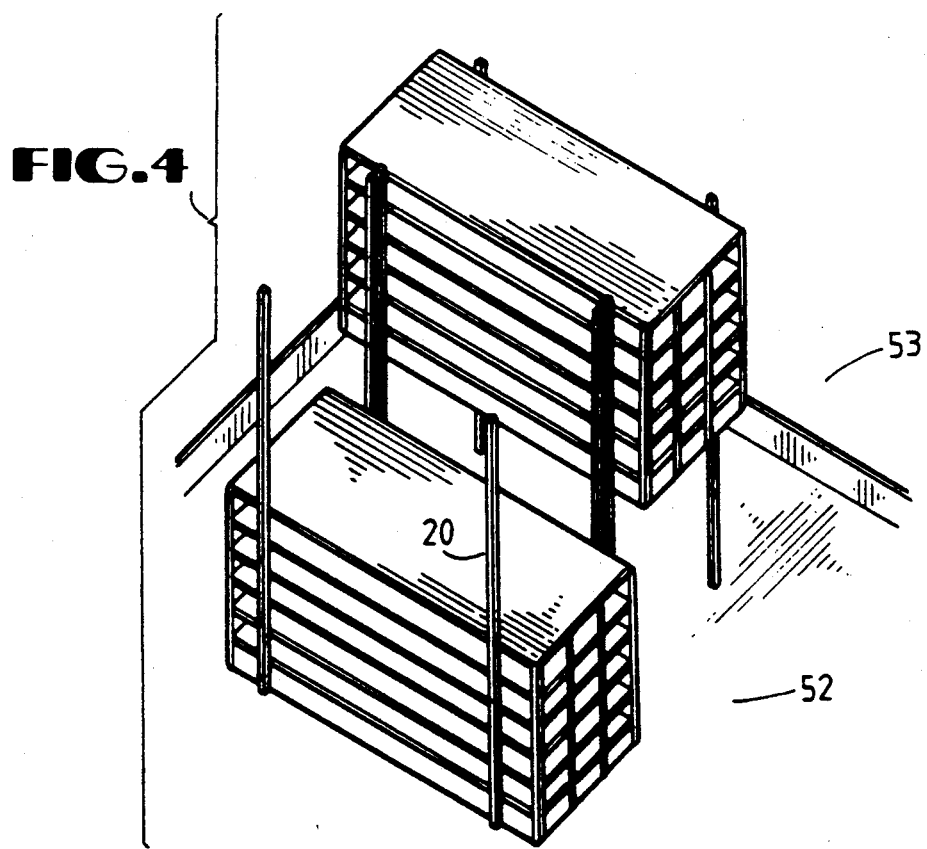
FIG. 4 is a prospective view showing two of the tray accumulator modules raised and lowered between adjacent floors in a building or other structure.

In many food service operations the dining areas are located on different floors from the cleaning areas. The present invention may function as both an accumulating device for trays and transport device between building floors. This can be seen in FIG. 4, showing two modular tray accumulator systems moved between a first floor 52 and a second floor 53.

Although variations in the embodiments of the present invention may not each realize all the advantages of the invention, certain features may become more important than others and various applications of the device. The invention, accordingly, should be understood to be limited only by the scope of the appended claims.

What is claimed is:

1. A modular mobile conveyor system for dish trays, comprising:
    (a) a modular frame, the frame having horizontal supports extending between a first end and second end, upright supports at each end, and lateral braces between the horizontal and upright supports;
    (b) a plurality of pairs of dish-tray supporting members mounted in horizontal and vertical rows, each pair of dish tray supporting members extending from the first end to the second end, each pair of dish tray supporting members having a first member with an L-shaped cross-section supporting one edge of a dish tray and a second member with an L-shaped cross-section supporting the opposite edge of the dish tray, each member mounted against an adjoining member;
    (c) a plurality of spacer rods between each pair of dish tray supporting members, each rod having at least one roller mounted thereon, some of the rollers being free-rotating and other rollers being driven;
    (d) a plurality of drive belts, each drive belt encircling the driven rollers between a pair of dish tray supporting members; and
    (e) a variable speed motor connected with the drive belts.

2. The modular mobile conveyor system of claim 1 wherein the driven wheels are formed from a semi-flexible material.

3. The modular mobile conveyor system of claim 1 wherein the free rotating rollers are removable from between the opposing dish tray supporting members.

4. The modular mobile conveyor system of claim 1 wherein the driven rollers are friction drive wheels made of a plastic material.

5. The modular mobile conveyor system of claim 1 wherein the driven rollers are rotary brushes.

6. The modular mobile conveyor system of claim 1 wherein the driven rollers are made of a material with a coefficient of friction such that the driven wheel may rotate while the dish tray positioned on the wheel remains stationary due to contact with a stationary object.

7. The modular mobile conveyor system of claim 1 further comprising a plurality of barriers at the second end of the dish tray supporting members for stopping movement of dish trays.

8. A modular mobile dish tray conveying system, comprising:
    (a) a frame supporting a plurality of pairs of opposing supporting members, the supporting members having first and second ends and being L-shaped in cross-section, each supporting member configured to support one edge of a dish tray;
    (b) a plurality of shafts between each pair of opposing supporting members;
    (c) a plurality of non-powered rollers mounted to the shafts;
    (d) a plurality of powered rollers mounted to the shafts; and
    (e) variable speed power delivery means mounted to the frame for rotating the powered rollers to move the dish trays forward from the first end to the second end of the opposing supporting members.

9. The modular mobile dish tray conveying system of claim 8 further comprising a plurality of drive belts connected between the variable speed power delivery means and the powered rollers.

10. The modular mobile dish tray conveying system of claim 8 wherein the powered rollers are made of a semi-flexible plastic material.

* * * * *

UNITED STATES PATENT AND TRADEMARK OFFICE
CERTIFICATE OF CORRECTION

PATENT NO. : 5,220,989
DATED : June 22, 1993
INVENTOR(S) : Lloyd H. Smith

It is certified that error appears in the above-identified patent and that said Letters Patent is hereby corrected as shown below:

column 4, line 19, the number "9" should be "29".

Signed and Sealed this

Twenty-second Day of February, 1994

Attest:

BRUCE LEHMAN

Attesting Officer

Commissioner of Patents and Trademarks